(12) United States Patent
Wooldridge et al.

(10) Patent No.: US 7,017,531 B2
(45) Date of Patent: Mar. 28, 2006

(54) VEHICLE INTERCOOL SYSTEM

(75) Inventors: Scott A. Wooldridge, Fort Wayne, IN (US); Brian J. Jacquay, New Haven, IN (US); James C. Bradley, New Haven, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 96 days.

(21) Appl. No.: 10/913,829

(22) Filed: Aug. 5, 2004

(65) Prior Publication Data
US 2005/0035209 A1    Feb. 17, 2005

Related U.S. Application Data

(60) Provisional application No. 60/494,998, filed on Aug. 14, 2003.

(51) Int. Cl.
*B60H 3/00* (2006.01)
(52) U.S. Cl. ............................... 123/41.11; 123/41.56; 123/41.63; 123/41.65; 123/559.1; 123/563; 123/565
(58) Field of Classification Search ............ 123/41.11, 123/41.56, 41.63, 41.65, 559.1, 563, 565; 180/68.3, 68.2
See application file for complete search history.

(56) References Cited

U.S. PATENT DOCUMENTS

| 3,933,136 A | 1/1976 | Burst |
| 4,070,070 A | 1/1978 | Eggers |
| 4,235,298 A | 11/1980 | Sackett et al. |
| 4,454,926 A * | 6/1984 | Akins .................. 180/68.1 |
| 4,523,657 A | 6/1985 | Kooyumjian |
| 4,566,407 A | 1/1986 | Peter |
| 4,736,727 A | 4/1988 | Williams |
| 4,831,981 A * | 5/1989 | Kitano .................. 123/198 E |
| 4,938,303 A | 7/1990 | Schaal et al. |
| 5,042,603 A | 8/1991 | Olson |
| 5,056,601 A | 10/1991 | Grimmer |
| 5,143,516 A | 9/1992 | Christensen |
| 5,172,753 A * | 12/1992 | Kadle et al. .................. 165/42 |
| 5,178,213 A | 1/1993 | Watson et al. |
| 5,181,554 A | 1/1993 | Mita |
| 5,193,608 A | 3/1993 | Sekine et al. |
| 5,528,900 A | 6/1996 | Prasad |
| 5,528,901 A | 6/1996 | Willis |
| 5,551,505 A | 9/1996 | Freeland |
| 5,588,482 A | 12/1996 | Holka |
| 6,202,782 B1 | 3/2001 | Hatanaka |
| 6,698,539 B1 * | 3/2004 | Decuir .................. 180/68.3 |
| 6,739,419 B1 | 5/2004 | Jain et al. |

* cited by examiner

*Primary Examiner*—Christopher P. Ellis
*Assistant Examiner*—Cynthia F. Collado
(74) *Attorney, Agent, or Firm*—Jeffrey P. Calfa; Dennis Kelly Sullivan; Susan L. Lukasik

(57) ABSTRACT

The invention involves a vehicle with a cab. The environment of the cab may be maintained by a heating, ventilation, and air-conditioning (HVAC) system that will provide cool air to the cab in hot weather and warm air to the cab in colder weather. The HVAC system will have its own specific air heating and cooling components. The HVAC has a supply to the cab for providing the cool or warm air depending on the need. A siphon or alternative point of distribution of the HVAC output may be a HVAC diversion line that leads into the inlet of the turbocharger or supercharger of the vehicle engine to mix with ambient air entering the turbocharger. In an alternative embodiment, a compressed air source may be bled into the turbocharger or supercharger inlet.

10 Claims, 4 Drawing Sheets

VEHICLE INTERCOOL SYSTEM

This patent issued from a non-provisional patent application claiming the priority of provisional patent application Ser. No. 60/494,998, filed Aug. 14, 2003.

BACKGROUND OF INVENTION

Vehicle engine performance may be improved by cooler intake or ambient temperature. This is particularly true for turbocharged or supercharged engines. The cooler the air the more efficient for the same power, the less fuel for the same torque is needed and therefore the less engine emissions produced. Cooler inlet air allows for smaller sized and less requirements for after-treatment systems and exhaust gas recirculation (EGR) systems. This invention allows for inter-relating two systems that do not inter-relate on current vehicles and in the process providing for better control of engine intake air temperature regardless of actual ambient temperature. One of these systems is the heating, ventilation, and air conditioning (HVAC) system of the vehicle and the other is the engine turbo-charger or supercharger sub-system of the vehicle.

SUMMARY

The invention involves a vehicle with a cab. The environment of the cab may be maintained by a heating, ventilation, and air-conditioning (HVAC) system that will provide cool air to the cab in hot weather and warm air to the cab in colder weather. The HVAC system will have its own specific air heating and cooling components. The HVAC has a supply to the cab for providing the cool or warm air depending on the need. A siphon or alternative point of distribution of the HVAC output may be a HVAC diversion line that leads into the inlet of the turbocharger to mix with ambient air entering the turbocharger. This provides cool air to the turbocharger inlet to drop the inlet temperature in the hot weather and hot air to the turbocharger inlet to raise inlet temperature in the cold weather. The cooler intake air in hot weather is denser and can offer cooler exhaust temperature and cooler engine temperatures. This helps the vehicle charge air cooler core size design and also better helps control of under hood temperatures. The more cooling air also helps with less turbocharger speeds. This should also help with less Exhaust Gas Recirculation (EGR) and engine fuel consumption. The cooler gases and less recirculation of gas should with exhaust diesel particulate filer and NOX catalyst life and reduce the size requirements.

DRAWINGS

Other objects and advantages of the invention will become more apparent upon perusal of the detailed description thereof and upon inspection of the drawings, in which.

DESCRIPTION OF INVENTION

Figure 1:
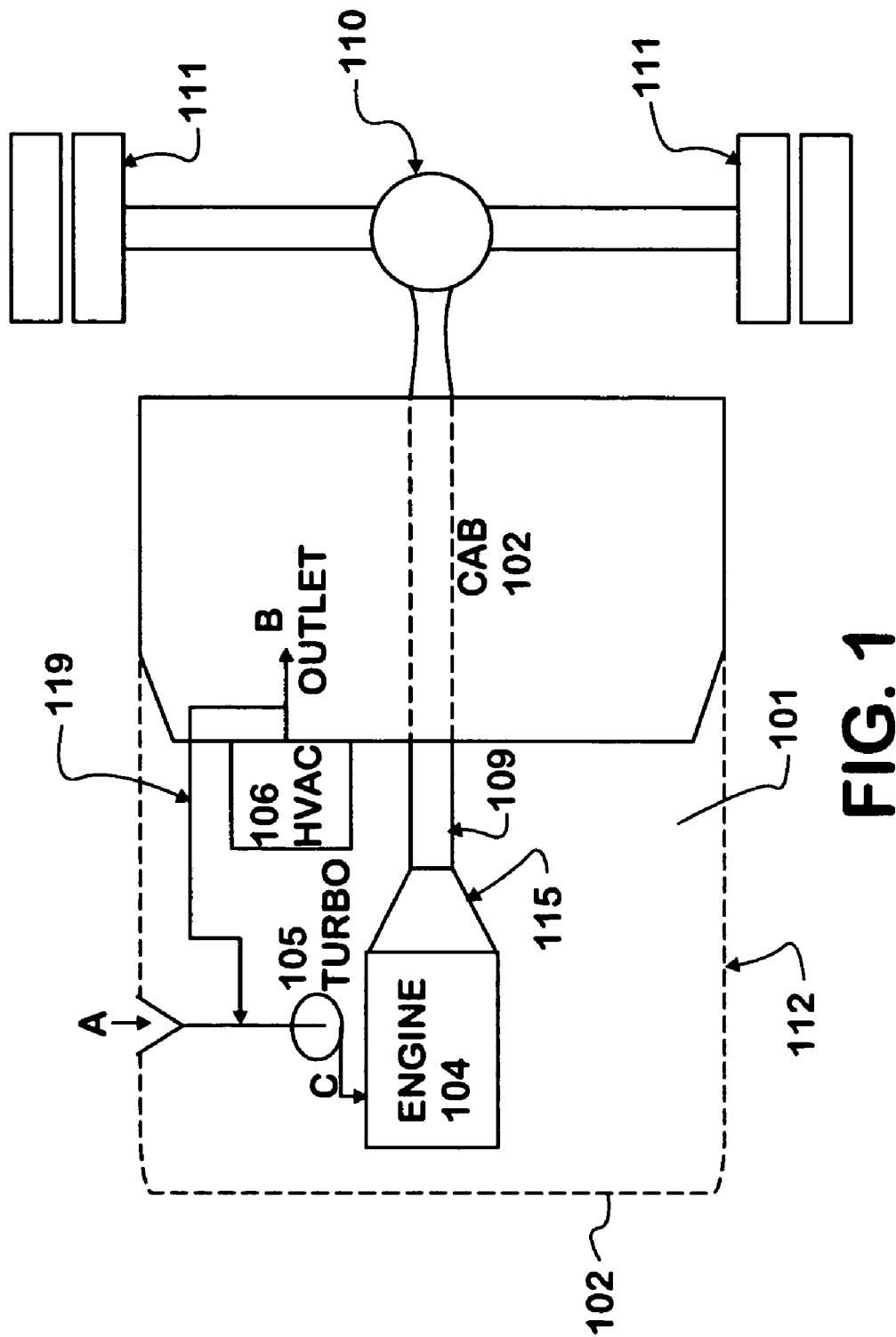
FIG. 1 is a vehicle using an embodiment of an intercool system and is made in accordance with this invention.

A vehicle 101 with an engine 104 may either use a turbocharger or a supercharger 105 for compressing the ambient inlet air to the engine 104 to improve engine performance. Such a vehicle is shown in FIG. 1. The difference between a turbocharger and a supercharger is merely the motive force for driving the compressor. The turbocharger uses engine exhaust as the motive force and the supercharger is driven otherwise. The invention described here applies to either turbocharged or supercharged engines. For convenience, the engine inlet air compressors are described as turbochargers 105 however this is just for convenience as we, the inventors, intend the invention to apply to both types of engine inlet air compressors. The engine 104 on a mobile vehicle 101 may drive a drive shaft 109 through a transmission 115. Drive shaft 109 rotation is imparted on the driving wheels 111 through a drive axle 110. The engine 104 is contained within an under hood area 112 of the chassis 102.

Figure 2:
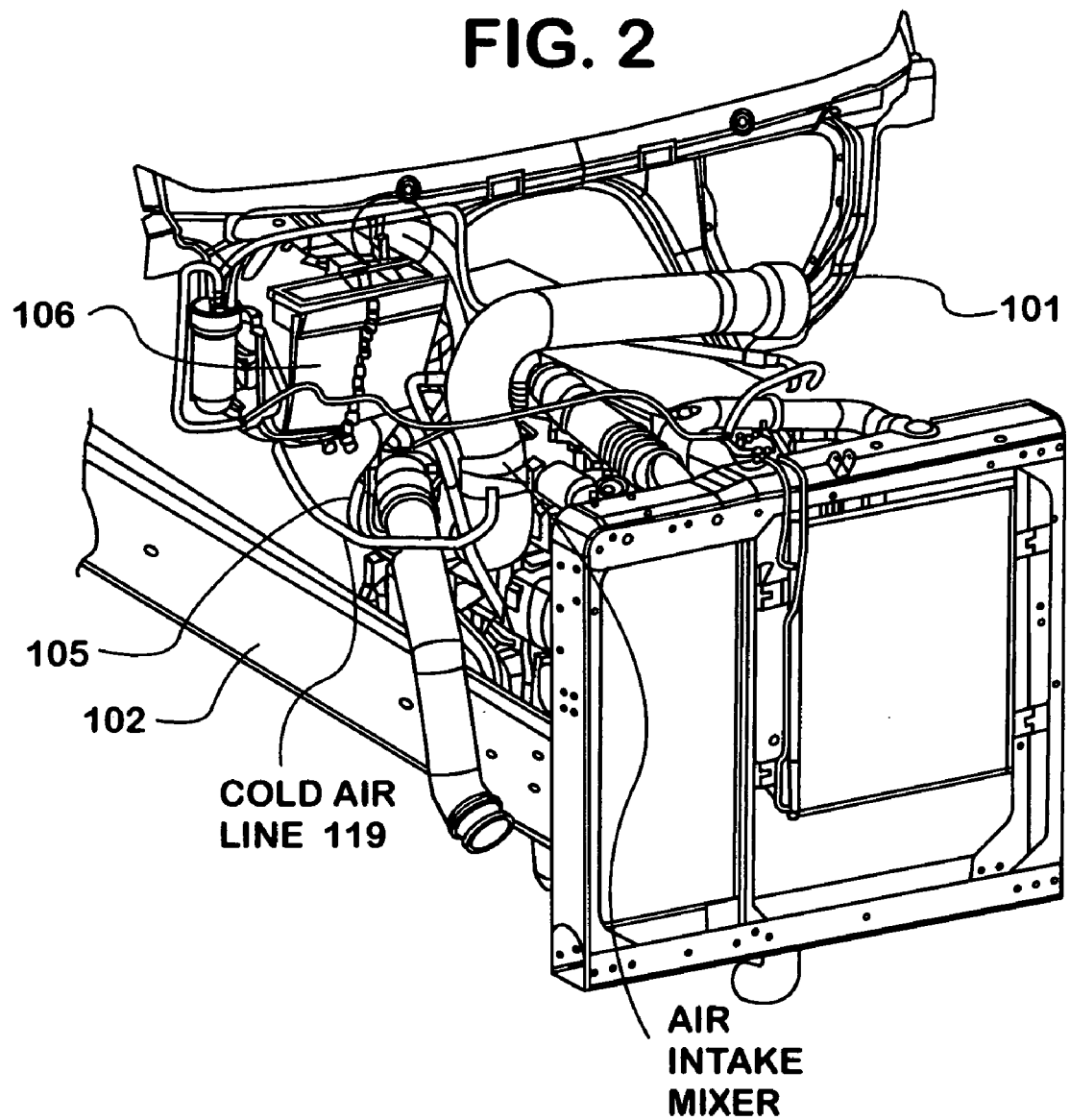
FIG. 2 is a perspective view of the embodiment of an intercool system shown in FIG. 1 as applied to a particular engine.
Figure 3:
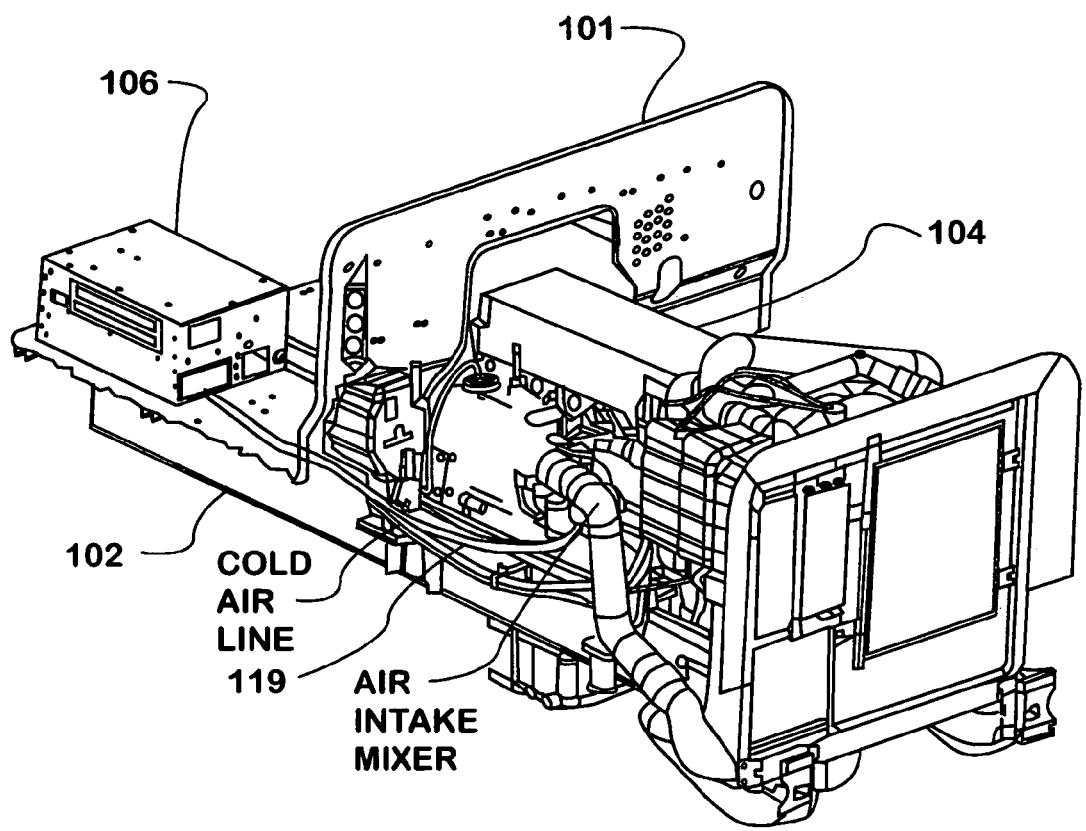
FIG. 3 is a perspective view of the embodiment of an intercool system shown in FIG. 1 as applied to another engine.

The vehicle 101 has a cab 102 or passenger compartment from which the vehicle 101 is operated. The environment of the cab 102 may be maintained by a heating, ventilation, and air-conditioning (HVAC) system 106 that will provide cool air to the cab 102 in hot weather and warm air to the cab 102 in colder weather. The HVAC system will have its own specific air heating and cooling components which may vary and in any case are not considered part of the invention as described. The HVAC system may generally have some cooling components such as a chiller or other cooler and some heating components, whether electric or thermal based from engine heat. The HVAC 106 has a supply B to the cab 102 for providing the cool or warm air depending on the need. A siphon or alternative point of distribution of the HVAC output may be a HVAC diversion line 119 that leads into the inlet of the turbocharger 105 to mix with ambient air A entering the turbocharger 105. The turbo charger discharges at point C. This is shown in FIGS. 1, 2, and 3.

In warm weather, the cooled HVAC 106 output air through the diversion line 119 reduces the temperature of the inlet air A to the turbocharger 105. As mentioned above this cooler turbocharged air will make the engine 104 more efficient for the same power, and use less fuel for the same torque. Therefore engine 104 emissions are reduced. Reduced emissions will become more important to diesel engine performance as the U.S. Environmental Protection Agency (EPA) 2007 model year regulations come into play. The 2007 emissions standards are much more rigid and vehicle manufacturers will be working hard to provide customers with sufficient power and fuel usage while not having to provide large capacity and expensive after-treatment systems. This cooler turbocharger inlet air allows for smaller after-treatment systems and smaller gas recirculation systems.

In cold weather, the warmed HVAC 106 output through the diversion line 119 may increase the temperature of the inlet air A to the turbocharger 105. This will allow the engine to reach optimum operating temperature sooner and therefore improve overall efficiency.

Figure 4:
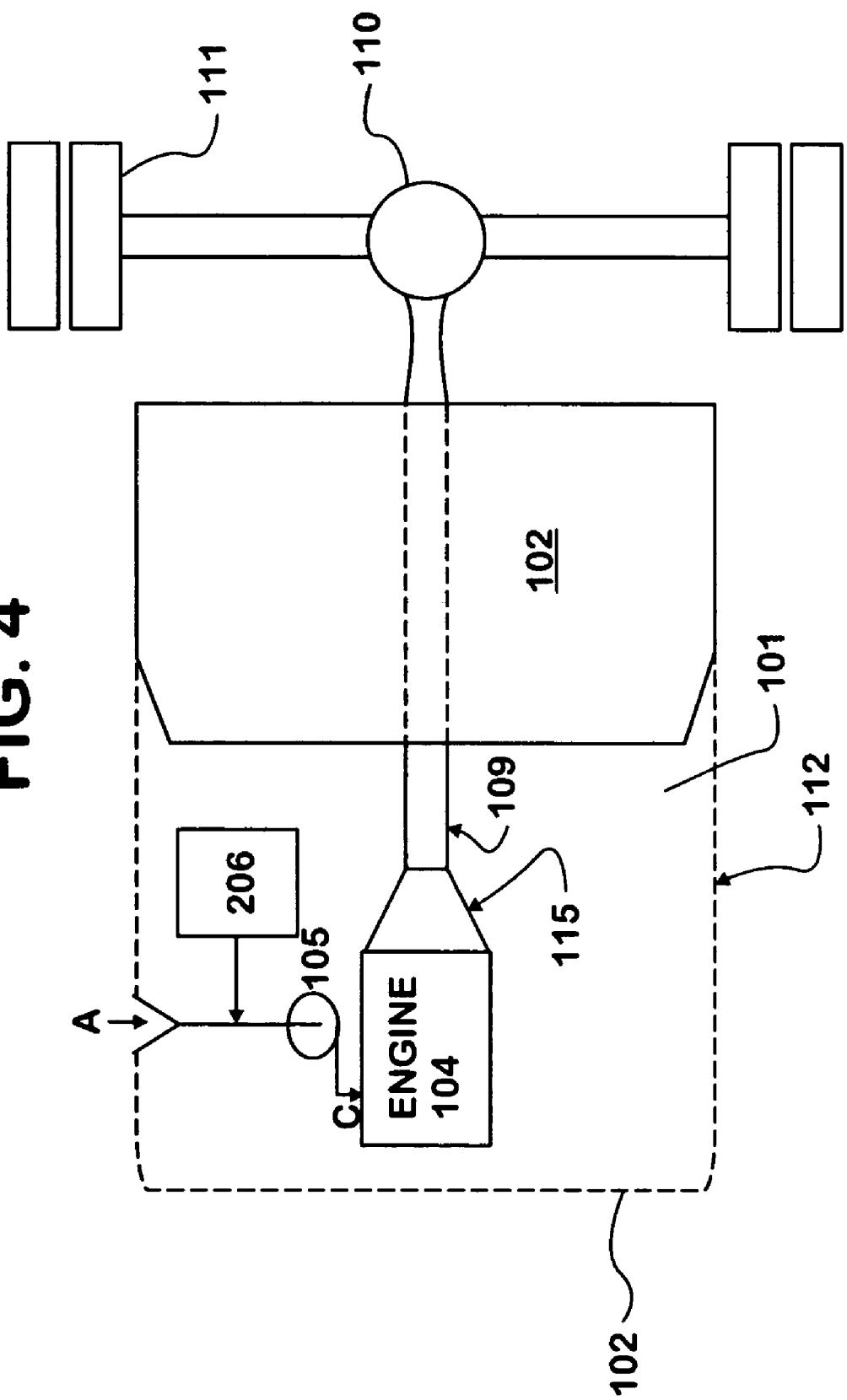
FIG. 4 is an alternative embodiment of an intercool system made in accordance with this invention.

An alternative embodiment of the invention is shown in FIG. 4. The engine 104 on a mobile vehicle 101 may drive a drive shaft 109 through a transmission 115. Drive shaft 109 rotation is imparted on the driving wheels 111 through a drive axle 110. The vehicle 101 has a cab 102 or passenger compartment from which the vehicle 101 is operated. A compressed air system 206 is engaged to the vehicle 101. A siphon or alternative point of distribution of the compressed air system 206 output may be a compressed air diversion line 219 that leads into the inlet of the turbocharger 105 to mix with ambient air A entering the turbocharger 105. The compressed air will have the similar impact as the HVAC input described above on turbocharger operation.

As described above, the vehicle and associated intercool system of this invention provide a number of advantages, some of which have been described above and others of which are inherent in the invention. Also modifications may be proposed to the vehicle and associated intercool system of this invention without departing from the teachings herein.

We claim:

1. A mobile vehicle, comprising:
   an engine with an engine inlet air compressor to compress incoming ambient air;
   said engine engaged to and for driving a drive shaft through a transmission and drive shaft rotation being imparted on driving wheels through a drive axle;
   said engine being contained within an under hood area of a chassis;
   a cab from which said vehicle is operated and said cab engaged to said chassis;
   an internal environment of said cab may be maintained by a heating, ventilation, and air-conditioning system; and
   said heating, ventilation, and air-conditioning system having a supply to said cab and a siphon from said heating, ventilation, and air-conditioning system output being a diversion line leading into an inlet of said engine inlet air compressor to mix with ambient air entering said engine inlet air compressor during operation.

2. The vehicle of claim 1, wherein said engine inlet air compressor is a turbocharger that is driven by engine exhaust.

3. The vehicle of claim 1, wherein said engine inlet air compressor is a supercharger that is driven by other than engine exhaust.

4. The vehicle of claim 2, wherein said engine is a diesel engine.

5. The vehicle of claim 3, wherein said engine is a gasoline powered engine.

6. A mobile vehicle, comprising:
   an engine with an engine inlet air compressor to compress incoming ambient air;
   said engine for driving a drive shaft through a transmission and drive shaft rotation being imparted on driving wheels through a drive axle;
   said engine being contained within an under hood area of a chassis;
   a cab from which said vehicle is operated and said cab engaged to said chassis;
   a compressed air system being engaged to said vehicle and a siphon from said compressed air system output being a diversion line leading into an inlet of said engine inlet air compressor to mix with ambient air entering said engine inlet air compressor during operation.

7. The vehicle of claim 6, wherein said engine inlet air compressor is a turbocharger that is driven by engine exhaust.

8. The vehicle of claim 6, wherein said engine inlet air compressor is a supercharger that is driven by other than engine exhaust.

9. The vehicle of claim 7, wherein said engine is a diesel engine.

10. The vehicle of claim 8, wherein said engine is a gasoline powered engine.

\* \* \* \* \*